United States Patent [19]

Lautenschläger, Jr. et al.

[11] Patent Number: 4,797,045

[45] Date of Patent: Jan. 10, 1989

[54] FORMATION OF A SCREW THREAD IN MOUNTING HOLES IN FURNITURE HARDWARE MADE OF SHEET METAL

[75] Inventors: Karl Lautenschläger, Jr., Reinheim; Gerhard Lautenschläger, Brensbach 1-Wersau, both of Fed. Rep. of Germany

[73] Assignee: Karl Lautenschlager GmbH & Co. KG, Reinheim, Fed. Rep. of Germany

[21] Appl. No.: 68,897

[22] Filed: Jun. 30, 1987

[30] Foreign Application Priority Data

Jul. 1, 1986 [DE] Fed. Rep. of Germany ....... 3622001

[51] Int. Cl.⁴ .................. F16B 39/00; F16B 37/12
[52] U.S. Cl. ........................... 411/107; 411/310; 411/324; 411/438; 411/533
[58] Field of Search ............... 411/103, 106, 107, 109, 411/251, 252, 288–291, 310, 311, 352, 353, 533, 438, 512, 999, 324

[56] References Cited

U.S. PATENT DOCUMENTS

| | | | |
|---|---|---|---|
| 1,778,368 | 10/1930 | Monnier | 411/941 |
| 3,036,673 | 5/1962 | Santerre | 411/112 |
| 3,723,941 | 3/1973 | Schumacher et al. | 411/103 |
| 3,892,031 | 7/1975 | Bisbing | 411/531 |
| 3,982,575 | 9/1976 | Ollis, Jr. et al. | 411/310 |

FOREIGN PATENT DOCUMENTS 560774 4/1944 United Kingdom ............... 411/288

Primary Examiner—Neill R. Wilson

[57] ABSTRACT

Formation of a screw thread in a mounting hole in furniture hardware made by the stamping and pressing process from thin sheet metal, which can be fastened to the furniture wall by means of mounting screws driven through the mounting hole into a furniture wall. The shaft of the mounting screw has at its head end a threadless section with a diameter smaller than the outer diameter of the thread. The mounting hole has a free passage cross section which is smaller than the outside diameter of the thread spirals of the mounting screw, and a ringlike section of the material surrounding the free passage cross section is bent to form a thread spiral extending over more than 180°, preferably more than 270°, but no more than 360°, with a pitch corresponding to the pitch of the mounting screw thread, a portion of the section of material forming the thread spiral being cut free from the surrounding material of the hardware piece along an arcuate boundary line.

6 Claims, 3 Drawing Sheets

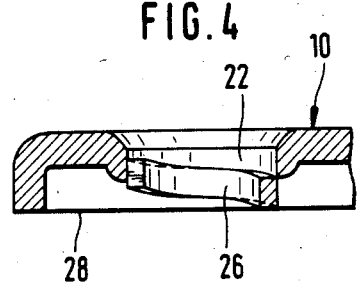
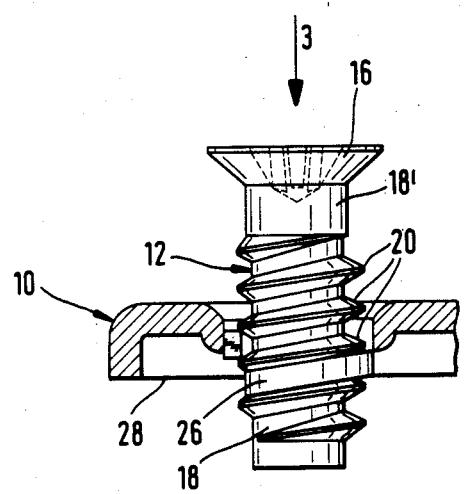
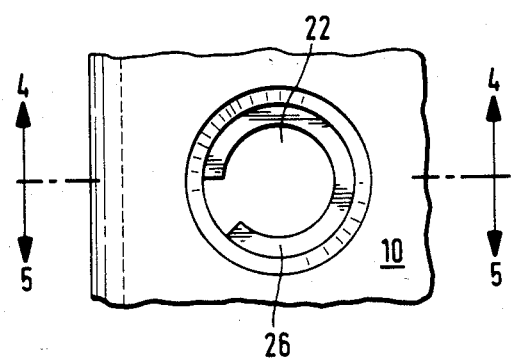
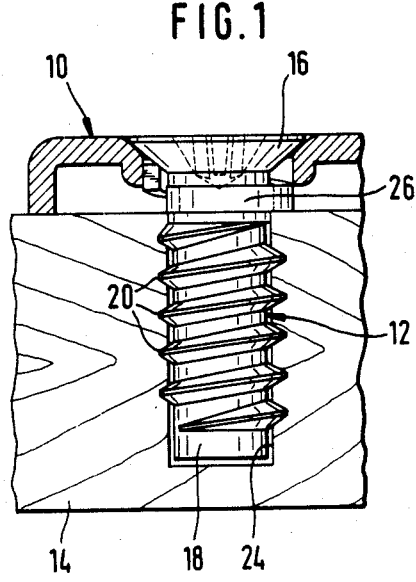
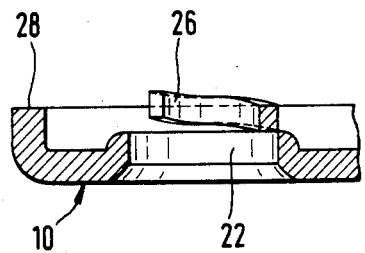

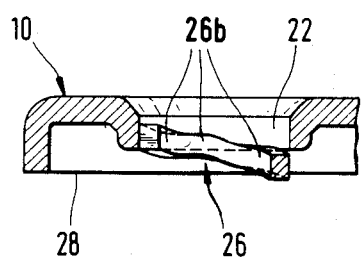
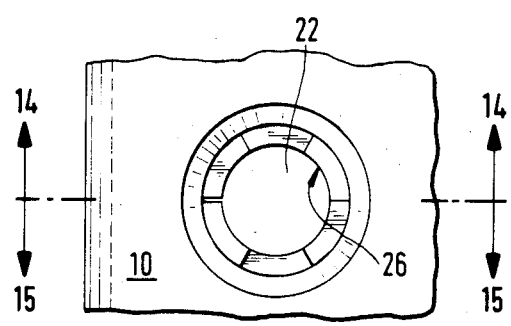
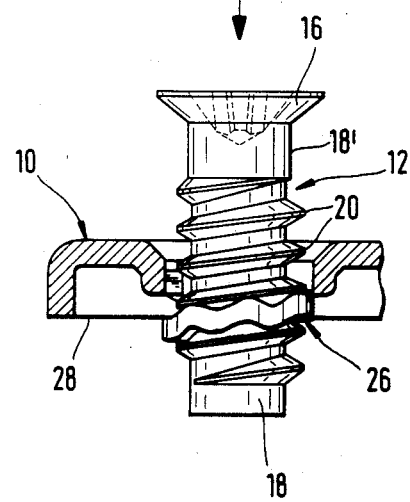
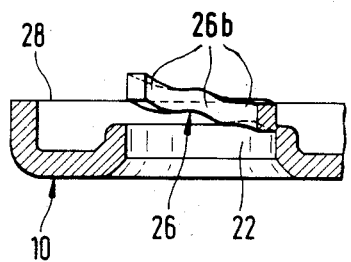
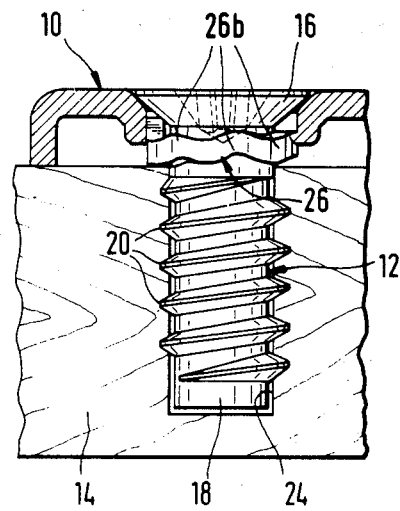

FORMATION OF A SCREW THREAD IN MOUNTING HOLES IN FURNITURE HARDWARE MADE OF SHEET METAL

BACKGROUND OF THE INVENTION

The invention relates to the formation of screw threads in mounting holes in furniture hardware made by stamping and pressing from this sheet metal which can be fastened to the furniture by means of a mounting screw threaded through the mounting hole into a bore in a cabinet wall, the shaft of the mounting screw having at its head end an unthreaded section with a diameter smaller than the outside diameter of the thread.

The production of furnitue hardware from sheet metal by the stamping and pressing method permits it to be made cheaply in large series. Such sheet-metal hardware is stronger than hardware made by injection molding methods from plastics or by pressure casting methods from metal, e.g., by die-casting from zinc alloy, and therefore it has a longer life, and, at least in comparison to die-cast metal alloy (Zamak) hardware, it is decidedly cheaper to make. As examples of furniture hardware which are being increasingly stamped from sheet metal and pressed to shape on account of the above-mentioned advantages, we shall mention only mounting plates for furniture hinges, which are mounted on the walls of furniture by means of screws, and on which the carcase-related part of a hinge, today usually in the form of an elongated arm and likewise made mostly from sheet metal by the stamping and pressing method, can be mounted so as to be adjustable in at least two coordinates. Other hardware parts that can be made of sheet metal are, for example, parts of joining hardware, shelf holders and the like. In the industrial installation of hardware—e.g., of the above-mentioned mounting plates—by screwing them to furniture, it is desirable to premount the screws in the hardware such that the hardware together with the premounted and only slightly started screw can be placed in the location where it is to be fastened to the furniture, and then the screws can be driven into the associated bores in the furniture with power screwdrivers. The screws are driven directly into bores in the furniture which are slightly smaller than the major diameter of the threads of the screws and thus create their own female threads in the wall of the bore. To obtain sufficient holding power, screws with relatively coarse threads are used; in recent times so-called "Euro screws" have been used, which have a relatively coarse, sharp-crested thread which can be driven with comparatively light torque into bores in wood materials but have great holding power due to the relatively great depth of penetration of the threads into the wall of the bore, and also they permit the repeated installation and removal of hardware. In hardware of thin sheet metal, the presetting of the mounting screws in the mounting holes, which creates no problems in the case of the relatively thick-walled plastic or die-cast hardware, presents a difficulty, because if they are to be held securely the mounting bore has to be provided with at least one spiral thread into which the thread of the mounting screw can be tightly driven. But the thickness of the sheet metal used is kept as thin as possible, so that the production of a thread running only as little as 270 around the hole within the thickness of the metal is not possible. Often the material thickness of the sheet metal is even less than the pitch length between two successive thread spirals, so that then it is impossible to form a thread spiral capable of securely engaging the thread of the mounting screw. Although the thread could be made in a separate nut which afterwards could be sweated to the hardware, or a cylindrical collar could be created around the mounting hole by forming it from the material of the hardware, and could then be tapped in a second, separate operation, this must be ruled out for reasons of cost, as well as in the case of sheet-metal hardware of low profile, also because the nut or projection protrudes below the bottom of the piece and would prevent it from lying flat on the furniture wall.

The invention is addressed to the problem of making mounting holes in furniture hardware of low profile out of thin sheet metal such that the conventional coarse-thread mounting screws will be able to be preset in the necessary play-free manner in the mounting bore, in correct alignment therewith.

SUMMARY OF THE INVENTION

This problem is solved according to the invention, in a thread forming operation of the kind mentioned above, by the fact that the mounting hole has a free passage cross section which is smaller than the major diameter of the threads of the corresponding mounting screw, and that a ring-like section of the material surrounding the free passage cross section is formed into a thread spiral extending over more than 180°, preferably more than 270°, but no more than 360°, with a pitch corresponding to the pitch of the mounting screw thread, part of the material section of which the thread spiral is formed being cut free of the surrounding material of the hardware piece along an arcuate boundary line.

Thus, the thickness of the material of the hardware piece that is lacking for the production of a thread spiral of sufficient circumferential length is compensated by the fact that the thread spiral is formed over at least a portion of its length by a section of material cut free and bent to a position corresponding to the pitch of the thread of the mounting screw. In this manner the shaft of the mounting screw is surrounded to a sufficient extent to be able to preset the mounting screw securely in place. On the other hand, however, the section of material cut free is resiliently deformable, so that it will not interfere with the tight screwing of the hardware piece against the surface of a wall, even if originally it protrudes from the underside of the hardware piece. For, as soon as the mounting screw has been driven in all the way to the threadless section adjacent the head, the material section that has been cut free can be bent back resiliently into the plane of the piece when the piece is tightly pressed by the head of the mounting screw against the mounting surface.

If the hardware piece is made from a sheet metal whose material thickness is equal to or slightly greater than the distance between two successive threads of the mounting screw as measured at the pitch diameter, the circularly defined material section forming the thread spiral can run run straight along its entire length with a pitch corresponding to the pitch of the thread of the mounting screw.

If, however, the hardware piece is made from a sheet metal whose thickness is less than the clear distance between two successive thread spirals of the mounting screw as measured at the pitch diameter, the configuration is preferably made such that the arcuately defined material section forming the thread spiral is divided into a series of steps succeeding one another circumferentially, each of which is offset stepwise relative to the one before and the one after, by such an amount in the direction of the longitudinal axis of the bore that the entire height, measured in the area of transition between two stepped sections, between the top side and bottom side of the thread spiral, is approximately equal to the distance, measured at the pitch diameter, between two succeeding thread spirals of the mounting screw. Due to the step-like configuration of the thread spiral formed from the hardware piece and cut partially free, it is brought about that the interval between two thread spirals of the mounting screw will be filled in the area of the steps and the mounting screws can thus be preset in place with no free play.

As an alternative to the above configuration, it is also possible to give the circularly defined material section forming the thread spiral a corrugated configuration in which the entire thickness measured between the top of a peak and the bottom of the adjacent valley will be about equal to the distance between two successive thread spirals of the mounting screw, as measured at the pitch diameter. Both the last-mentioned corrugated configuration and the step-like configuration, mentioned above, of the thread spiral that is partially cut free, requires no separate operation and, by a corresponding configuration of the stamping and pressing die, can be produced simultaneously in the normal manufacture of the hardware piece.

BRIEF DESCRIPTION OF THE DRAWING

The invention is further explained in the description that follows of two embodiments, in conjunction with the drawing wherein:

FIG. 1 is a cut-away side view, partially in section, of a furniture hardware piece made from sheet metal by the stamping and pressing method, attached to a cabinet wall by a mounting screw, FIG. 2 is a side view similar to that of FIG. 1 of a portion of the hardware piece with the mounting screw shown in the pre-set position, FIG. 3 is a cut-away top view of the hardware piece without the mounting screw, as seen in the direction of the arrow 3 in FIG. 2, FIG. 4 is a side view seen in the direction of the arrows 4—4 in FIG. 3, FIG. 5 is a side view seen in the direction of the arrows 5—5 in FIG. 3.

FIG. 11 is a side view of a modified furniture hardware piece similar to that of FIG. 6, made by stamping and pressing from sheet metal of small material thickness and fastened on a cabinet wall by a mounting screw;

FIG. 12 is a cross section corresponding to that of FIG. 11 with the mounting screw in the pre-set position;

FIG. 13 is a top view of the same portion of the hardware piece without the mounting screw, as seen in the direction of arrow 13 in FIG. 12;

FIG. 14 is a cross section seen in the direction of the arrows 14—14 in FIG. 13; and FIG. 15 is a cross section as seen in the direction of the arrows 15—15 in FIG. 13.

DETAILED DESCRIPTION OF PREFERRED EMBODIMENTS

Figure 9:
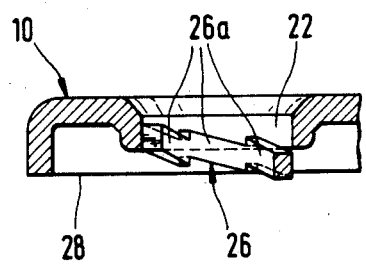
FIG. 9 is a cross section seen in the direction of the arrows 9—9 in FIG. 8.
Figure 7:
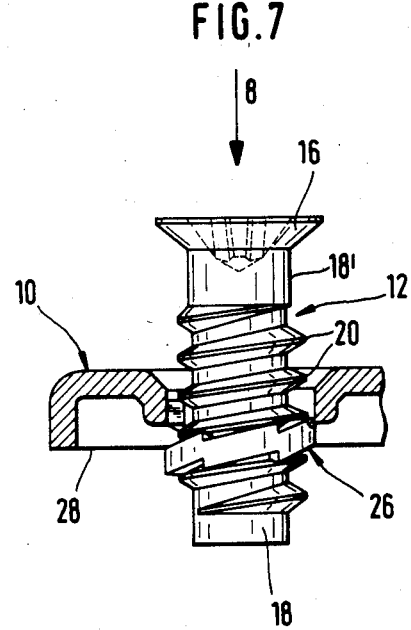
FIG. 7 is a cross-section corresponding to that of FIG. 6, taken through the portion of the hardware piece with a mounting screw represented in the pre-set position.

In FIG. 1 there is shown a furniture hardware part 10 made by stamping and pressing from sheet steel, and fastened by means of a mounting screw 12 on a cabinet wall 14, only a portion of the piece 10 being shown, which is, for example, one of the lateral wing-like ears of a mounting plate, known as a wing plate, for cabinet hinges. The mounting plate as a whole then has a second wing, not shown, which is in a mirror-image relationship to the one shown, and which can be fastened to the wall 14 with a second mounting screw, also not shown.

In FIG. 2, the portion of the hardware piece 10 and the mounting screw 12 are shown also without the corresponding cabinet wall 14 and with the mounting screw 12 in an only slightly started state. The mounting screw shown is a so-called "Euro screw" with a flat head 16 and which has a shaft 18 with a relatively coarse, single, sharp-edged thread 20 which terminates at some distance below the flat head 16, so that between the head 16 and the thread 20 a smooth shaft section 18' remains whose diameter is smaller than the outer diameter of the thread 20. The mounting screw 12 is threaded through a chamfered mounting hole 22 which is produced in the hardware piece 10 simultaneously in the stamping and pressing operation, as will be explained further below in conjunction with FIGS. 3 to 5, and is driven into a plain bore 24 in the cabinet wall 14. Assuming that the hardware piece 10 is a wing plate, the bore 24 is then one of a vertical row of holes adjacent the cabinet door which are sometimes provided in the cabinet side walls of cabinets of modern construction to accommodate shelf holders. This, of course, does not exclude the making of separate holes 24 for mounting the hardware piece 10. It is apparent that the bore 24 has a diameter that is slightly smaller than the outside diameter of the thread on the threaded portion 18 of the screw, so that the thread 20, when the screw 12 is first driven, will by itself cut the complementary female thread into the bore 24.

The actual free passage cross section of the mounting hole 22 in the hardware piece 10 is smaller than the major diameter of the thread of the mounting screw 12 and greater than the root diameter of the threaded shaft 18, while in the stamping and pressing operation a ring-shaped material section 26 surrounding the free passage cross section of the mounting bore is formed into a thread spiral extending in the represented case (FIG. 3) over approximately 315°, with a pitch corresponding to the pitch of the thread 20 of the mounting screw 12. For this purpose the material section 26 is cut free from the surrounding material of the piece 10 over a portion of its circumferential length along a circular line, and is bent to the slope determined by the thread pitch. In FIG. 5 it can be seen especially that the free end of the ring-like material section 26, when bent out of the surrounding material, protrudes beyond the actual bearing surface 28 of the hardware piece 10 against the surface of the cabinet wall 14, and thus it appears that it might prevent the piece 10 from being tightened to the point where the bearing surface 28 will contact the cabinet wall 14. Actually, however, this is not the case, because the cut-free end of the ring-like material section 26 will flex sufficiently, after it engages the surface of the cabinet wall 14 and passes over from thread 20 onto the threadless shaft section 18', to enable it to be bent back resiliently as the mounting screw 12 is further tightened. The portion of the ring-like material section 26 that originally protrudes beyond the bearing surface 28 will therefore be bent back to the position shown in FIG. 1 behind the bearing surface 28 when the mounting screw 12 is drawn up tightly.

In the case of the embodiment represented in FIGS. 1 to 5, the sheet metal material used for the production of the hardware piece 10 has a thickness which corresponds approximately to the distance between two succeeding spirals of the mounting screw 12. If the thickness of the sheet metal should be slightly greater, the ring-like material section 26 must additionally be slightly compressed in the stamping and pressing operation so as to fit between the spirals of the thread 20 of the mounting screw 12.

If, however, the hardware piece 10 is made from sheet metal of a thickness that is decidedly less than the average distance between two successive spirals of the thread 20, the ring-like material section 26, formed in the manner described above, would have free play between the spirals of a pre-set mounting screw 12, so that this mounting screw would not be held tightly in the position in which it is aligned at right angles to the hardware piece 10. In the installation of the hardware pieces in large series manufacture with automatic tools, it might therefore happen that the screw will be deflected away from the vertical position actually called for and an automatic screwdriver will not be applied correctly to the flat head 16. The modification of the above-described embodiment that is represented in FIGS. 6 to 10 has been developed for such cases; in this embodiment an additional thread spiral formed from a ring-like material section 26' serves according to the same basic principle for the presetting of a mounting screw 12, while the ring-like material section 26 is additionally shaped such that a preset mounting screw 12 will be held without free play.

To avoid unnecessary repetition, only the additional shaping of the ring-like material section 26 will be described below, while otherwise the above description of the embodiment according to FIGS. 1 to 5 can be consulted, since equal parts of both embodiments are associated with the same reference numbers in the drawing.

The play-free holding of the threaded shaft 18 of the mounting screw 12 in the mounting bore 22 is achieved simply by dividing the circularly defined material section 26 forming the thread spiral into a series of steps 26a running circumferentially, each of which is offset step-wise relative to the preceding and following steps 26a by such an amount in the direction of the longitudinal axis of the thread that the total distance between the top and bottom sides of the thread spiral, measured in the area of transition between two step sections, is approximately equal to the average distance between two successive thread spirals of the mounting screw 12.

As it can be seen in the drawing, the pitch of each step 26a is therefore slightly greater than the pitch of the thread 20 of the mounting screw, so that each step 26a makes contact at its opposite ends on opposite sides between the spirals of the thread 20 of the mounting screw. Owing to the number of successive step sections 26a, sufficient contact points between the material section 26 and the thread spirals of the thread 20 are formed to permit the mounting screw 12 to be pre-mounted without free play in the mounting hole 22.

Figure 8:
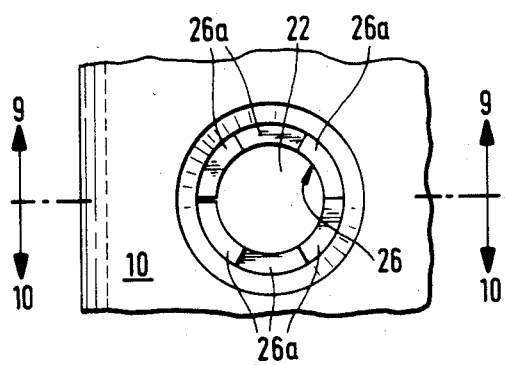
FIG. 8 is a top view of the same portion of the hardware piece without the mounting screw, as seen in the direction of arrow 8 in FIG. 7.
Figure 10:
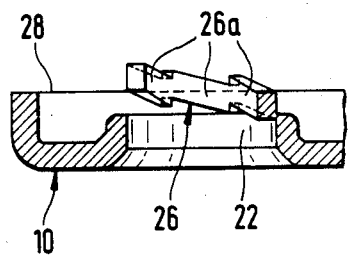
FIG. 10 is a cross-section seen in the direction of the arrows 10—10 in FIG. 8.
Figure 6:
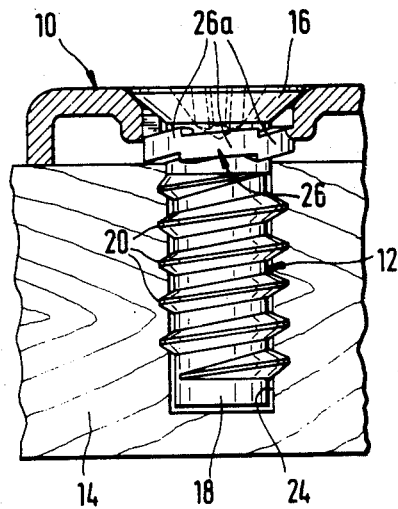
FIG. 6 is a side view like that of FIG. 1, seen through a portion of a furniture hardware piece made by stamping and pressing from sheet metal of small material thickness and fastened on a cabinet wall by a mounting screw.

An alternative to the embodiment described above in connection with FIGS. 6 to 10 is shown in FIGS. 11 to 15. In it the circularly defined and partially cut free material section 26 forming the thread spiral is not divided into step sections 26a offset step-wise from one another, but that the material section is given a corrugated 26b configuration, while the total height measured between the peak of a corrugation and the bottom of the adjacent valley is approximately equal to the average distance between two successive thread spirals of the mounting screw. As in the case of the embodiment of FIGS. 6 to 10 described above and provided with step-like sections, it is then recommendable to make the circumferential length of the circularly defined material section as great as possible in order to bring a maximum number of steps 26a of corrugations 26b to bear on the spirals of the mounting screw 12. The circularly defined material section 26 is therefore represented in the case of the embodiment shown in FIGS. 6 to 10 and 11 to 15 with a length of 360° (FIGS. 8 and 13).

We claim:

1. In combination: a piece of furniture hardware of relatively thin stamped and pressed sheet metal, having a section defining a mounting hole; and a mounting screw extending through the mounting hole; said screw having a head, a shaft with a thread, and adjacent the head a thread-less portion with a diameter smaller than that of the thread, the thickness of the sheet metal section being the same or slightly greater than the spacing between two adjacent turns of the thread measured at a central diameter of the thread, the mounting hole having a free cross section which is smaller than the outer diameter of the thread, the sheet metal section being annular, and having a thread extending continuously over more than 180° up to a maximum of 360°, with a pitch corresponding to that of the thread of the mounting screw, a portion of the annular section being cut free from the surrounding sheet metal along an arcuate boundary line; whereby the thread in the mounting hole is sufficient to pre-set the mounting screw, but upon screwing of the mounting screw into a bore in a piece of furniture the annular section is free of the thread of the mounting screw and surrounds the thread-less section and the head presses the furniture hardware against the piece of furniture.

2. The combination according to claim 1, wherein the thread of the sheet metal section extends over more than 270°.

3. In combination: a piece of furniture hardware of relatively thin stamped and pressed sheet metal, having a section defining a mounting hole; and a mounting screw extending through the mounting hole; said screw having a head, a shaft with a thread, and adjacent the head of a thread-less portion with a diameter smaller than that of the thread, the thickness of the sheet metal section being smaller than the spacing between two adjacent turns of the thread measured at a central diameter of the thread, the mounting hole having a free cross section which is smaller than the outer diameter of the thread, the sheet metal section being annular, and having a thread extending over more than 180° up to a maximum of 360°, with a pitch corresponding to that of the thread of the mounting screw, a portion of the annular section being cut free from the surrounding sheet metal along an arcuate boundary line, the annular section being divided into a series of step sections succeeding one another in circumferential direction, each step section being offset step-wise relative to a preceding and a following step section in the direction of the longitudinal axis of the mounting hole, by such an amount that the entire height measured between two step sections between an upper side and a bottom side of the turn of the thread is approximately equal to the spacing between two succeeding turns measured at the central average thread diameter; whereby the thread in the mounting hole is sufficient to pre-set the mounting screw, but upon screwing of the mounting screw into a bore in a piece of furniture the annular section is free of the thread of the mounting screw and surrounds the thread-less section and the head presses the furniture hardware against the piece of furniture.

4. The combination according to claim 3, wherein the thread of the sheet metal section extends over more than 270°.

5. In combination: a piece of furniture hardware of relatively thin stamped and pressed sheet metal, having a section defining a mounting hole; and a mounting screw extending through the mounting hole; said screw having a head, a shaft with a thread, and adjacent the head a thread-less portion with a diameter smaller than that of the thread, the thickness of the sheet metal section being smaller than the spacing between two adjacent turns of the thread measured at a central diameter of the thread, the mounting hole having a free cross section which is smaller than the outer diameter of the thread, the sheet metal section being annular, and having a thread extending over more than 180° up to a maximum of 360°, with a pitch corresponding to that of the thread of the mounting screw, a portion of the annular section being cut free from the surrounding sheet metal along an arcuate boundary line, the annular section being corrugated, the height measured between a top of a peak and a bottom of an adjacent valley of the corrugated section being approximately equal to the clear spacing between two succeeding turns measured at the central average thread diameter; whereby the thread in the mounting hole is sufficient to pre-set the mounting screw, but upon screwing of the mounting screw into a bore in a piece of furniture the annular section is free of the thread of the mounting screw and surrounds the thread-less section and the head presses the furniture hardware against the piece of furniture.

6. The combination according to claim 5, wherein the thread of the sheet metal section extends over more than 270°.

* * * * *